United States Patent
Netravali et al.

(10) Patent No.: US 7,966,385 B2
(45) Date of Patent: Jun. 21, 2011

(54) METHODS AND APPARATUS FOR VIRTUAL NETWORK CONFIGURATION

(75) Inventors: Arun N. Netravali, Westfield, NJ (US); Edward Stanley Szurkowski, Maplewood, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1841 days.

(21) Appl. No.: 10/449,998

(22) Filed: May 30, 2003

(65) Prior Publication Data

US 2004/0243705 A1   Dec. 2, 2004

(51) Int. Cl.
G06F 15/177    (2006.01)
G06F 15/16    (2006.01)

(52) U.S. Cl. .................. 709/220; 707/217; 707/222

(58) Field of Classification Search .................. None
See application file for complete search history.

(56) References Cited

U.S. PATENT DOCUMENTS

| | | | | |
|---|---|---|---|---|
| 5,751,967 A * | 5/1998 | Raab et al. | ..................... | 709/228 |
| 5,802,286 A * | 9/1998 | Dere et al. | ..................... | 709/220 |
| 5,892,912 A * | 4/1999 | Suzuki et al. | ............ | 370/395.53 |
| 5,999,812 A * | 12/1999 | Himsworth | ................. | 455/435.2 |
| 6,130,892 A * | 10/2000 | Short et al. | ..................... | 370/401 |
| 6,208,649 B1 * | 3/2001 | Kloth | ............................. | 370/392 |
| 6,374,290 B1 * | 4/2002 | Scharber et al. | .............. | 709/205 |
| 6,529,513 B1 * | 3/2003 | Howard et al. | ............... | 370/401 |
| 6,636,489 B1 * | 10/2003 | Fingerhut | ..................... | 370/328 |
| 7,043,539 B1 * | 5/2006 | Treiber et al. | ................. | 709/220 |

* cited by examiner

*Primary Examiner* — John B. Walsh
(74) *Attorney, Agent, or Firm* — Ryan, Mason & Lewis, LLP

(57) ABSTRACT

A virtual network is configured in a communication system in such a manner that the virtual network is not required to have associated therewith any particular physical home location, or more generally any dedicated arrangement of physical network infrastructure elements. The communication system includes a communication network, such as a wireless network or the Internet, connectable to one or more user communication elements. Information is received from a given one of the communication elements indicating association of the given communication element with a particular virtual network, and responsive to the received information the virtual network is configured to include the given communication element. The virtual network may be comprised entirely of remote users. Emulated data network and voice network functionality may be provided to those users without requiring their corresponding entity to have a physical home location for data network and voice network elements, or any particular dedicated arrangement of such physical network infrastructure elements.

20 Claims, 2 Drawing Sheets

METHODS AND APPARATUS FOR VIRTUAL NETWORK CONFIGURATION

FIELD OF THE INVENTION

The present invention relates generally to communication systems, and more particularly to communication systems that are configurable to implement virtual networks.

BACKGROUND OF THE INVENTION

A number of techniques are known in the art for configuring a virtual network. For example, virtual office, virtual local area network (LAN), and virtual private branch exchange (PBX) techniques have been developed. Such techniques can generally allow remote users working outside of their normal office or other "home" location to use features or capabilities of actual voice or data networks at the physical home location, as if the remote users were locally present and connected to the actual networks. This capability advantageously presents the appearance that any remote users are co-located with the local users at the physical home location, except for possible differences in communication performance due to bandwidth restrictions or other limitations in the wireless connections or other channels over which the remote users communicate with the networks at the home location.

A significant drawback of the existing techniques is that they generally fail to take maximum advantage of the improved connectivity provided by emerging wireless networks.

Emerging wireless networks include, by way of example, third-generation (3G) wireless cellular systems such as 3G Universal Mobile Telecommunications System (UMTS) or the 3G Partnership Project (3GPP) Wideband CDMA (WCDMA) system, as well as wireless local area networks such as those based on the IEEE 802.11 standards. These and other recently-developed wireless networks generally provide a substantially higher data transmission capability than corresponding predecessor networks.

With regard to the above-noted drawback, conventional techniques may more specifically be characterized as requiring an actual network at a given physical home location, or more generally some particular dedicated arrangement of hardware, software or other physical network infrastructure elements, in order to provide the virtual office, virtual LAN, virtual PBX or other similar capabilities to remote users.

A need therefore exists in the art for improved techniques for configuring virtual networks, so as to remove or alleviate the undue restrictions that arise from the existing requirement that a given virtual network be associated with a particular dedicated arrangement of hardware, software or other physical network infrastructure elements.

SUMMARY OF THE INVENTION

The present invention addresses the above-noted drawback of the prior art by providing in the illustrative embodiments techniques for configuring what is referred to herein as an "all-virtual" network, that is, a virtual network that is not required to have any particular dedicated arrangement of physical network infrastructure elements associated therewith.

In accordance with one aspect of the invention, a virtual network is configured in a communication system in such a manner that the virtual network is not required to have any particular dedicated arrangement of physical network infrastructure elements associated therewith. The communication system includes a communication network, such as a wireless network or the Internet, connectable to one or more user communication elements. Information is received from a given one of the communication elements indicating association of the given communication element with a particular virtual network, and responsive to the received information the virtual network is configured to include the given communication element.

The received information may comprise, by way of example, a connection request, at least a portion of a network address of the given communication element, or a signal generated based at least in part on a network address associated with a packet transmitted by the given communication element.

In accordance with another aspect of the invention, the given communication element may comprise a hub-based wireless communication element. The hub-based wireless communication element may include a wireless module for establishing a communication connection between an associated hub and a wireless network, and a number of ports each connectable to a corresponding one of a plurality of user processing devices. When the hub-based wireless communication element is included within the virtual network, all of its associated user processing devices appear as elements on the virtual network.

In accordance with a further aspect of the invention, the configuration of the virtual network may be controlled by one or more servers associated with the communication network. The one or more servers may store, for example, state and configuration information characterizing the virtual network, and may be operated by a virtual network service provider which is distinct from the communication network service provider. The one or more servers may be associated with an access element configured to determine if the given communication element has generated a packet or packets directed to an element of the virtual network, and if so to generate a corresponding signal to the one or more servers.

Advantageously, an all-virtual network in accordance with the invention may be comprised entirely of remote users, with emulated data network and voice network functionality being provided to those users without their corresponding entity having a physical home location for data network and voice network elements, or more generally without any particular dedicated arrangement of hardware, software or other physical network infrastructure elements.

These and other features and advantages of the present invention will become more apparent from the accompanying drawings and the following detailed description.

DETAILED DESCRIPTION OF THE INVENTION

Figure 1:
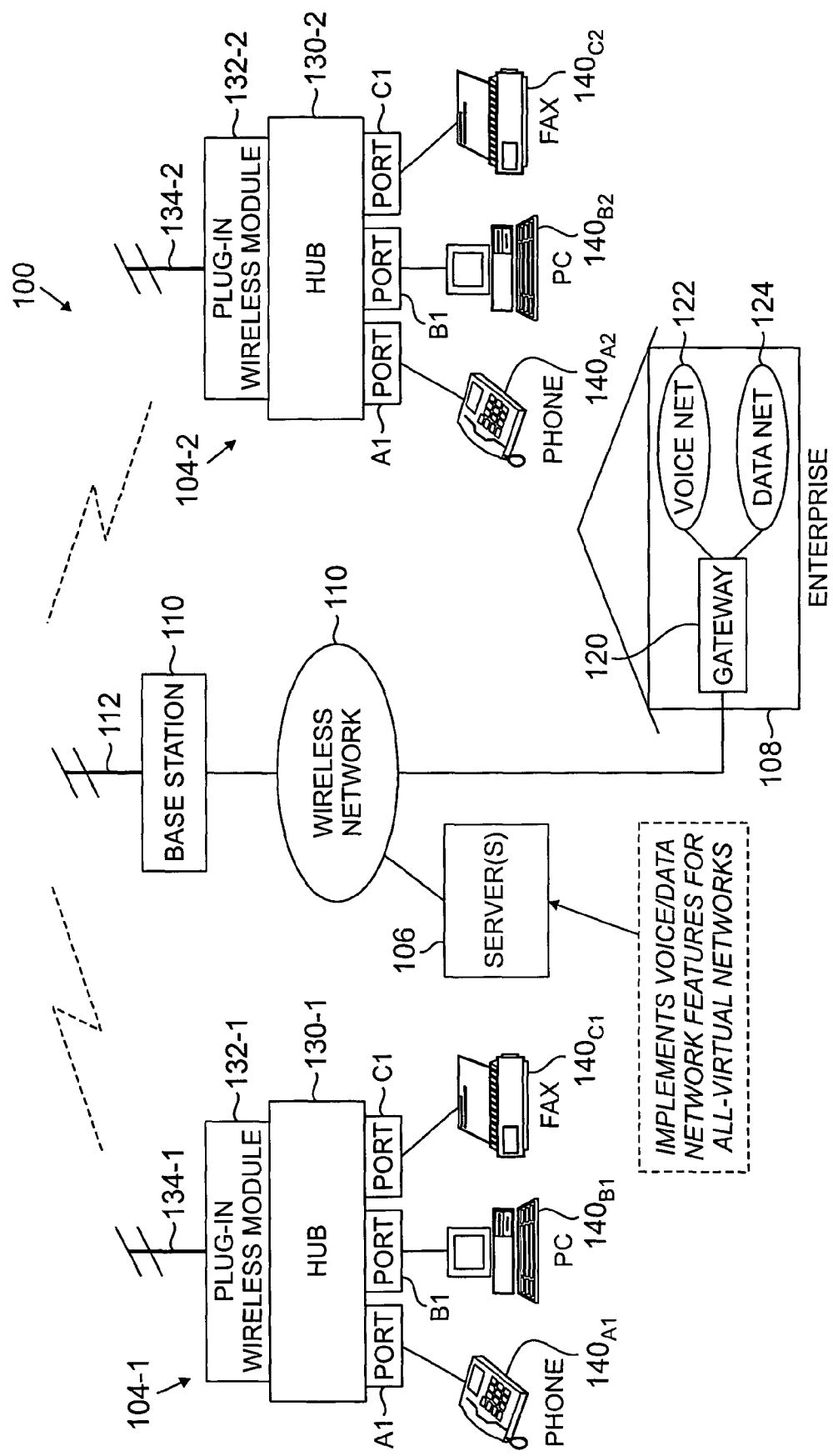
FIG. 1 is a block diagram of an exemplary communication system in accordance with a first illustrative embodiment of the invention.

The present invention will be illustrated below in conjunction with exemplary communication systems in which a wireless network communicates with one or more hub-based wireless communication elements, each having associated therewith one or more user processing devices, for the purpose of configuring a virtual network. It should be understood, however, that the disclosed techniques are suitable for use with a wide variety of other types of communication system configurations. For example, although one or more hub-based wireless communication elements are utilized in the preferred embodiments, the invention does not require the use of such wireless communication elements, and can be implemented using a mix of wireless and wired connections, or entirely with wired connections.

The present invention in the illustrative embodiments described below provides techniques for configuring an all-virtual network, that is, a virtual network that is not required to have any particular physical home location associated therewith. More generally, an all-virtual network is a virtual network that does not require any particular dedicated arrangement of hardware, software or other physical network infrastructure elements in order to provide associated functionality to virtual network users. Instead, any data network or voice network functionality provided to the all-virtual network users may be entirely emulated.

Although actual hardware, software and other physical network infrastructure elements exist in the corresponding system and are utilized in providing the emulated functionality, there is no need for any particular assignment of hardware, software or other physical network infrastructure elements to a given all-virtual network.

Such an arrangement is particularly advantageous in a number of different ways. For example, it allows the physical network infrastructure to be shared among many all-virtual networks, thereby resulting in economies of scale and other efficiencies. In addition, it allows the physical network infrastructure to grow, evolve or otherwise change with no adverse impact on the emulated functionality provided to the all-virtual network users. Furthermore, it allows the all-virtual network users to change their apparent network resources without requiring corresponding changes in the physical network infrastructure, assuming sufficient resources exist.

By way of example, in the illustrative embodiments, emerging wireless networks are utilized to support a virtual office, virtual LAN, virtual PBX or other virtual network that may be associated with a given enterprise or other entity but otherwise has no corresponding physical home location. This all-virtual network can therefore be dedicated or otherwise allocated to an enterprise or other entity that comprises only remote users. Emulated data network and voice network functionality may be provided to those users without requiring their corresponding entity to have a physical home location for data network and voice network elements, or any other dedicated arrangement of hardware, software or other physical network infrastructure elements.

The remote users may be permitted to join and to leave the all-virtual network at will. To those users, the all-virtual network generally appears to operate in substantially the same manner as an actual physical network, with typical support systems such as directories, file servers and voice mail, and with gateways, firewalls or other conventional network elements for supporting interfaces to other networks such as a public switched telephone network (PSTN) and the Internet. It may also or alternatively provide the features common in a conventional PBX, including extension dialing, multiple call appearances, secretarial stations, call routing, caller ID, etc.

FIG. 1 shows a portion of a communication system 100 in accordance with a first illustrative embodiment of the invention. The system 100 includes a wireless network 102, first and second hub-based wireless communication elements 104-1 and 104-2, respectively, a set of one or more servers 106, and an enterprise 108. The server or servers 106 and enterprise 108 are each coupled to the wireless network 102. Associated with the wireless network 102 is a base station 110 coupled to an antenna 112, for supporting communications between the wireless network 102 and the hub-based wireless communication elements 104-1 and 104-2.

The wireless network 102 may comprise one of the above-noted emerging wireless networks, such as a 3G UMTS or 3GPP WCDMA network, or an IEEE 802.11 network, as well as portions or combinations of these or other wireless networks. As indicated above, the present invention does not require the use of any particular type of wireless network.

The one or more servers 106 are configured for controlling the provision of voice and/or data network features for all-virtual networks, as will be described in greater detail below. The server(s) 106 are an example of an element also referred to herein as a virtual network server or an all-virtual network server.

Although only two of the hub-based wireless communication elements are shown in FIG. 1, the system 100 may more generally include any desired number N of such elements 104-$i$, $i=1, 2, \ldots N$.

As shown in the figure, the hub-based wireless communication element 104-1 comprises a hub 130-1 which includes ports A1, B1 and C1 and a slot or other mechanism for receiving a plug-in wireless module 132-1. The plug-in wireless module 132-1 includes or is otherwise associated with a wireless antenna 134-1. The module 132-1 and associated antenna 134-1 support communication between the hub 130-1 and the wireless network 102 via the base station 110 and antenna 112, using well-known conventional techniques. Also associated with the hub-based wireless communication element 104-1 is a set of user processing devices including a telephone $140_{A1}$ coupled to port A1, a personal computer $140_{B1}$ coupled to port B1, and a facsimile machine $140_{C1}$ coupled to port C1.

Similarly, the hub-based wireless communication element 104-2 comprises a hub 130-2 which includes ports A2, B2 and C2 and a slot or other mechanism for receiving a plug-in wireless module 132-2. The plug-in wireless module 132-2 includes or is otherwise associated with a wireless antenna 134-2. The module 132-2 and associated antenna 134-2 support communication between the hub 130-2 and the wireless network 102 via the base station 110 and antenna 112, using well-known conventional techniques. A set of user processing devices is coupled to the hub 130-2, including a telephone $140_{A2}$ coupled to port A2, a personal computer $140_{B2}$ coupled to port B2, and a facsimile machine $140_{C2}$ coupled to port C2.

It is to be appreciated that the particular number of ports and the associated user processing devices as shown in FIG. 1 is by way of illustrative example only, and a given hub-based wireless communication element may include more or fewer ports, and may be coupled to more or fewer user processing devices of any desired type. Moreover, a given hub-based wireless communication device may be implemented using a wide variety of alternative configurations. For example, the plug-in wireless module may be replaced with a corresponding built-in element or other module providing substantially the same communication functionality but physically implemented within the hub itself. As another example, a given user processing device may be implemented at least in part within the hub itself, rather than being coupled thereto via one of the hub ports as illustrated in the figure.

More particular examples of additional or alternative user processing devices that may be coupled to or at least partially incorporated within the hub include wireless telephones, personal digital assistants (PDAs), Internet protocol (IP) telephones for supporting voice-over-IP (VoIP) functionality, printers, scanners, etc.

In the system 100, a given one of the hub-based wireless communication elements may be configured such that, once activated, that element authenticates itself to a service provider associated with the wireless network 102 and opens a connection to an all-virtual network provided under control of the server(s) 106.

It may also be desirable in certain applications to provide an ability for the given hub-based wireless communication element to obtain access via a gateway 120 to a voice network 122 and data network 124 associated with enterprise 108, although as indicated previously an advantage of the present invention is that it does not require any such physical home location. The gateway 120 may be configured to adapt one or more protocols used by the wireless network service provider to the enterprise voice network 122 and data network 124, using well-known conventional techniques. The gateway 120 may also be configured to control or otherwise participate in functions such as authentication and updating directory services as needed. Although shown in the figure as being within the enterprise 108, elements 120, 122 and 124 need not be so configured. For example, one or more of these elements may be located within the service provider network, or elsewhere in the system 100.

The all-virtual network may be initially configured by the server(s) 106 when a first one of the N hub-based wireless communication elements goes "on-line" to the wireless network 102 or otherwise transmits a connection request or other information indicating association of the communication element with a particular all-virtual network. Other communication elements can then be added to the all-virtual network in a similar manner.

The all-virtual network in this illustrative embodiment comprises state and configuration information under the control of the server(s) 106. This information may include, by way of example, descriptions of the existing topology of the all-virtual network, including identifiers of network elements such as servers, routers, switches and gateways, along with details of the particular addressing schemes used.

It is generally expected that any hardware, software or other physical network infrastructure elements utilized in implementing a given all-virtual network can be multiplexed or otherwise shared among several such networks and many users and user terminals. The system 100 will thus preferably support multiple all-virtual networks at any given time, each of which may include one or more of the hub-based wireless communication elements 104.

The all-virtual network server(s) 106 could be operated by the wireless network service provider or by an unrelated entity. For example, multiple all-virtual network service providers may exist, each offering different network features and prices, but sharing a common wireless network infrastructure.

After the all-virtual network is configured to include a given one of the hub-based wireless communication elements, the user processing devices associated with that element then act as if they were directly connected to a physical network, and have access to all the defined resources of that network. Any other communication elements already included within the all-virtual network at the time the given element joins the network will see that element, and its associated user processing devices, as joining the network.

The accessible network resources may be defined for a given hub-based wireless communication element as part of an initial setup or other configuration process for the all-virtual network, typically conducted when the corresponding user signs up for the all-virtual network service with a network service provider.

The server(s) 106 may also be configured to allow the accessible network resources for a given user or set of users to be selected, altered or otherwise defined in real time. For example, a web site could be maintained by the network service provider which is accessible to the virtual network users and provides an appropriate user interface for permitting user control of accessible network resources.

In the illustrative embodiment of FIG. 1, the user communication elements which comprise the all-virtual network are hub-based wireless communication elements. As indicated previously, however, this is not a requirement of the present invention, and a given embodiment of the invention may include only wired communication elements, or a combination of wired and wireless communication elements. An illustrative embodiment of the invention which includes both a wired communication element and a wireless communication element will now be described with reference to FIG. 2.

Figure 2:
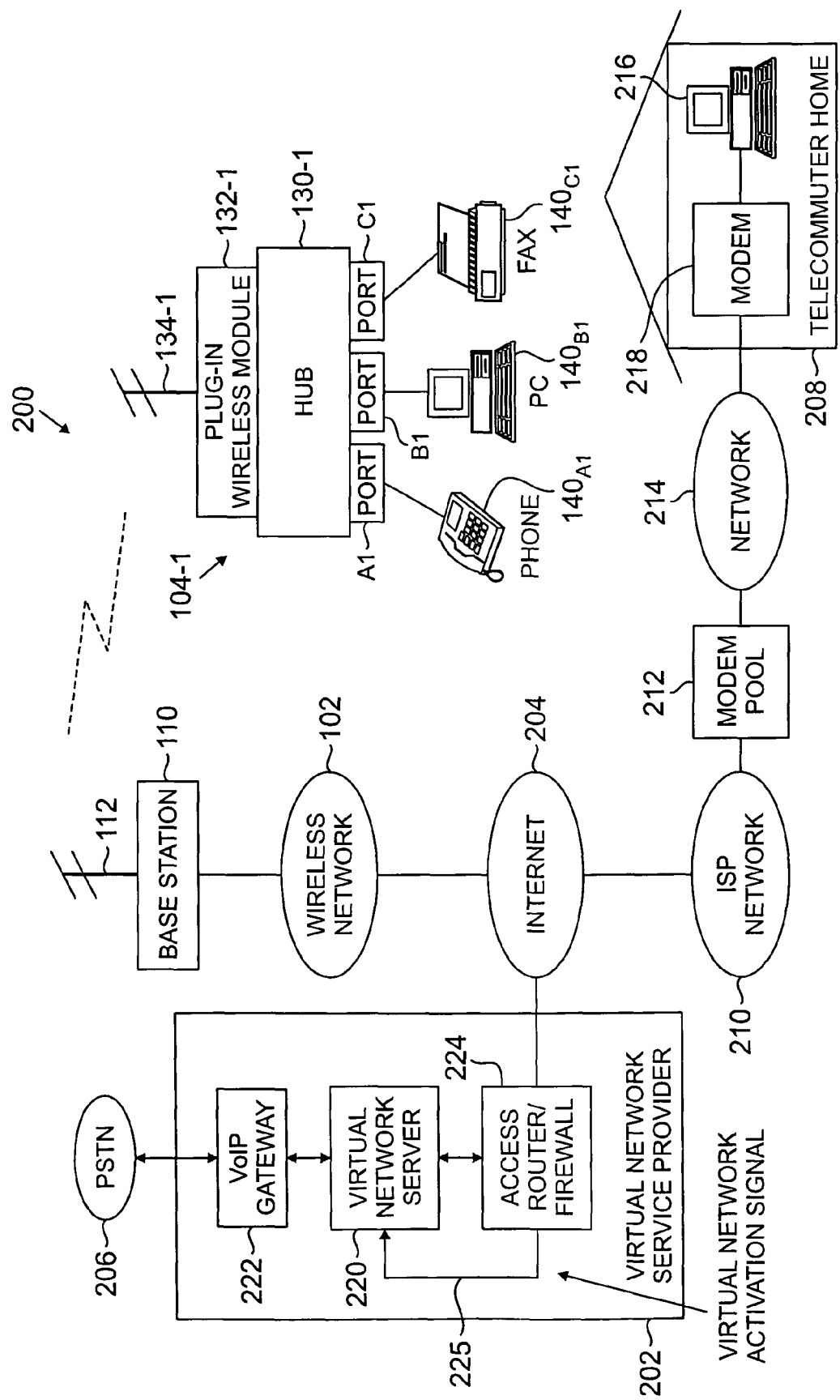
FIG. 2 is a block diagram of an exemplary communication system in accordance with a second illustrative embodiment of the invention.

The system 200 of FIG. 2 includes wireless network 102 and hub-based wireless communication element 104-1. As previously described, the hub-based wireless communication element 104-1 communicates with wireless network 102 via plug-in wireless module 132-1, antenna 134-1, wireless network antenna 112 and wireless base station 110. The hub-based wireless communication element 104-1 in this embodiment represents the wireless communication element referred to above.

Also included in the system 200 is a virtual network service provider 202, coupled to Internet 204 and PSTN 206.

The wired communication element referred to above is associated with a telecommuter home location 208 coupled to Internet 204 via an Internet service provider (ISP) network 210, modem pool element 212 and network 214 as shown. More specifically, the wired communication element comprises a personal computer 216 having an associated modem 218 connectable to the network 214.

The virtual network service provider 202 includes a virtual network server 220 that is coupled via a VoIP gateway 222 to the PSTN 206. The VoIP gateway 222 allows the all-virtual network to support conventional "plain old telephone service" (POTS) calls over the PSTN. The virtual network service provider 202 further includes an access router/firewall element 224, which may comprise an access router, a firewall or both an access router and a firewall. Although shown in the figure as a single server, the virtual network server 220 may comprise multiple servers, as in the embodiment previously described in conjunction with FIG. 1.

Advantageously, the system 200 is configured such that the hub-based wireless communication element 104-1 and the wired communication element comprising personal computer 216 can each access an all-virtual network by establishing an appropriate connection with the virtual network service provider 202 via the Internet 204. More generally, this type of system arrangement allows a given all-virtual network to be accessed by any otherwise-authorized user that can access the Internet.

In conjunction with the establishment of such a connection, the access router/firewall element 224 generates a virtual network activation signal on line 225 to provide an indication to the virtual network server 220, for example, that a packet addressed to an all-virtual network has been received by the virtual network service provider 202. The server 220 can then configure the all-virtual network in a manner similar to that previously described in conjunction with the FIG. 1 embodiment.

As mentioned previously, the system 200 supports both wired and wireless access to an all-virtual network, via the respective wired and wireless communication elements.

Another advantage of this exemplary arrangement is that it allows any wired or wireless network to be used with any virtual network service provider, thereby separating the two businesses and their corresponding services.

The particular arrangement of elements shown in the illustrative embodiment of FIG. 2 is by way of example only, and numerous alternative configurations are possible. For example, the particular number and type of communication elements can be varied, as can the particular manner in which such elements are interconnected with wireless network 102 or Internet 204. In addition, various system elements can be replaced with other elements of a type known to those skilled in the art. System elements other than those specifically shown may therefore be used in alternative embodiments.

The virtual network servers 106, 220 described above may each be implemented as one or more processor-based devices, each including conventional processors coupled to electronic memory and other storage elements. The processor-based devices are configured for executing one or more software programs for implementing at least a portion of the functionality the above-described process for configuring an all-virtual network in such a manner that no particular physical home location, or more generally no particular dedicated arrangement of hardware, software or other physical network infrastructure elements, is required to be associated therewith.

The present invention can therefore be implemented in whole or in part in software stored on a machine-readable medium, e.g., an optical or magnetic disk, a disk-based storage device, an electronic memory, etc., and executed by a processor associated with a server or other system element.

As indicated previously, those skilled in the art will recognize that many alternative configurations are possible for systems 100 and 200 and the elements thereof, e.g., using elements other than those specifically shown in FIGS. 1 and 2. It should therefore again be emphasized that the invention is not restricted to use with any particular system configuration.

For example, in alternative embodiments, other types of received information from a given communication element may be used to initiate configuration of the all-virtual network to include that element. These and numerous other alternative embodiments within the scope of the following claims will be apparent to those skilled in the art.

We claim:

1. A method for configuring a virtual network in a communication system, the communication system comprising a communication network connectable to one or more user communication elements, the method comprising the steps of:
   receiving from a given one of the communication elements initiation information indicating that an association of the given communication element with a particular virtual network is to be established, wherein the initiation information is transmitted by the given communication element upon activation of the given communication element; and
   responsive to the received information, configuring the virtual network to include the given communication element;
   wherein the virtual network is configured in such a manner that it is not required to have any particular dedicated arrangement of physical network infrastructure elements associated therewith; and
   wherein the virtual network is configured to include the given communication element under the control of one or more servers associated with the communication network.

2. The method of claim 1 wherein the virtual network is configured in such a manner that it is not required to have any particular physical home location associated therewith.

3. The method of claim 1 wherein the communication network comprises a wireless network connectable to one or more wireless communication elements.

4. The method of claim 1 wherein the communication network comprises a wired network connectable to one or more wired communication elements.

5. The method of claim 3 wherein the one or more wireless communication elements comprise at least one hub-based wireless communication element.

6. The method of claim 5 wherein the hub-based wireless communication element comprises a wireless module for establishing a communication connection between an associated hub and the wireless network.

7. The method of claim 5 wherein the hub-based wireless communication element comprises a plurality of ports each connectable to a corresponding one of a plurality of user processing devices.

8. The method of claim 1 wherein the virtual network is allocatable to an entity that comprises a plurality of users each associated with at least a corresponding one of the communication elements.

9. The method of claim 1 wherein the one or more servers store state and configuration information characterizing the virtual network.

10. The method of claim 1 wherein the one or more servers are operated by a network service provider which provides the communication network.

11. The method of claim 1 wherein the one or more servers are operated by an entity unrelated to a network service provider which provides the communication network.

12. The method of claim 1 wherein the one or more servers are associated with a virtual network service provider and further have associated therewith an access element which determines if the given communication element has generated a packet directed to an element of the virtual network and if so generates a corresponding signal to the one or more servers.

13. The method of claim 1 wherein the system is configured to support a plurality of virtual networks at a given point in time, each of at least a subset of the plurality of virtual networks including one or more of the communication elements.

14. The method of claim 1 wherein a set of accessible virtual network resources are defined for the given communication element as part of an initial setup or other configuration process for the virtual network.

15. The method of claim 14 wherein the system provides an interface whereby the set of accessible network resources may be periodically altered at least in part under user control.

16. The method of claim 1 wherein the received information comprises at least one of: (i) a connection request; (ii) at least a portion of a network address of the given communication element; and (iii) a signal generated based at least in part on a network address associated with a packet transmitted by the given communication element.

17. A method for configuring a virtual network in a communication system, the communication system comprising a communication network connectable to one or more user communication elements, the method comprising the steps of:
   receiving from a given one of the communication elements initiation information indicating that an association of the given communication element with a particular virtual network is to be established, wherein the initiation information is transmitted by the given communication element upon activation of the given communication element; and responsive to the received information, configuring the virtual network to include the given communication element;

wherein the virtual network is configured in such a manner that it is not required to have any particular dedicated arrangement of physical network infrastructure elements associated therewith;

wherein the system is configured to support a plurality of virtual networks at a given point in time, each of at least a subset of the plurality of virtual networks including one or more of the communication elements; and wherein at least one of the plurality of virtual networks is provided under the control of a first network service provider, and at least one other of the plurality of virtual networks is provided under the control of a second network service provider associated with the system and unrelated to the first network service provider, the first and second network service providers sharing at least a portion of a physical network infrastructure of the system.

18. An apparatus for configuring a virtual network in a communication system, the communication system comprising a communication network connectable to one or more user communication elements, the apparatus comprising:

a processor-based device comprising a processor coupled to a memory, the device being configurable to receive from a given one of the communication elements initiation information indicating that an association of the given communication element with a particular virtual network is to be established, wherein the initiation information is transmitted by the given communication element upon activation of the given communication element; and responsive to the received information, configure the virtual network to include the given communication element;

wherein the virtual network is configured in such a manner that it is not required to have any particular dedicated arrangement of physical network infrastructure elements associated therewith; and wherein the virtual network is configured to include the given communication element under the control of one or more servers associated with the communication network.

19. The apparatus of claim 18 wherein the system is configured to support a plurality of virtual networks at a given point in time, each of at least a subset of the plurality of virtual networks including one or more of the communication elements, and wherein at least one of the plurality of virtual networks is provided under the control of a first network service provider, and at least one other of the plurality of virtual networks is provided under the control of a second network service provider associated with the system and unrelated to the first network service provider, the first and second network service providers sharing at least a portion of a physical network infrastructure of the system.

20. A non-transitory machine-readable medium storing one or more programs for use in configuring a virtual network in a communication system, the communication system comprising a communication network connectable to one or more user communication elements, wherein the one or more programs when executed by a processor implement the steps of:

receiving from a given one of the communication elements initiation information indicating that an association of the given communication element with a particular virtual network is to be established, wherein the initiation information is transmitted by the given communication element upon activation of the given communication element; and responsive to the received information, configuring the virtual network to include the given communication element;

wherein the virtual network is configured in such a manner that it is not required to have any particular dedicated arrangement of physical network infrastructure elements associated therewith; and wherein the virtual network is configured to include the given communication element under the control of one or more servers associated with the communication network.

* * * * *